US006972895B2

(12) United States Patent
Hwang et al.

(10) Patent No.: US 6,972,895 B2
(45) Date of Patent: Dec. 6, 2005

(54) LONG-WAVELENGTH OPTICAL FIBER AMPLIFIER

(75) Inventors: Seong-Taek Hwang, Pyongtaek-shi (KR); Hong-Seok Shin, Suwon-shi (KR); Byung-Chang Kang, Yongin-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 334 days.

(21) Appl. No.: 10/453,098

(22) Filed: Jun. 3, 2003

(65) Prior Publication Data

US 2004/0057106 A1 Mar. 25, 2004

(30) Foreign Application Priority Data

Sep. 23, 2002 (KR) ...................... 10-2002-0057537

(51) Int. Cl.[7] ............................................ H04B 10/12
(52) U.S. Cl. ................. 359/341.4; 359/337.11
(58) Field of Search ....................... 359/337.11, 341.4, 359/341.41

(56) References Cited

U.S. PATENT DOCUMENTS

| 6,292,291 | B1 * | 9/2001 | Yoon et al. ............ 359/337.13 |
| 6,337,764 | B1 | 1/2002 | Yoon et al. ............ 359/341.41 |
| 6,570,701 | B1 * | 5/2003 | Hwang et al. ............ 359/341.1 |
| 6,738,184 | B2 * | 5/2004 | Hayashi et al. .......... 359/341.4 |

| 2004/0012843 | A1 * | 1/2004 | Aozasa et al. ........... 359/337.1 |
| 2004/0109226 | A1 * | 6/2004 | Song et al. ............... 359/341.1 |

FOREIGN PATENT DOCUMENTS

CN 1284658 2/2001 ............ G02F 1/39

* cited by examiner

*Primary Examiner*—Jack Keith
*Assistant Examiner*—Eric Bolda
(74) *Attorney, Agent, or Firm*—Cha & Reiter, L.L.C.

(57) ABSTRACT

An optical fiber amplifier is disclosed for amplifying an input optical signal in the long wavelength band. The amplifier include first and second pumping light sources, a photo detector for detecting the intensity of the input optical signal, an erbium-doped optical fiber, and a controller. The optical fiber is brought to a first-pumped state by the first pumping light output from the first pumping light source. This generates an amplified spontaneous emission in the short wavelength band. The optical fiber is brought to a second-pumped state by the amplified spontaneous emission and outputs an induced emission light in the long wavelength band. The second pumping light source outputs a second pumping light in the same wavelength band as the amplified spontaneous emission, while controlling the intensity of the second pumping light by an output control signal, thereby controlling the intensity of the second-pumped state of the optical fiber. The controller calculates the amount of optical intensity loss and the number of channels of the input optical signal, based on the detected optical intensity, and transmits the output control signal to the second pumping light source for compensating the loss of the input optical signal.

8 Claims, 4 Drawing Sheets

LONG-WAVELENGTH OPTICAL FIBER AMPLIFIER

CLAIM OF PRIORITY

This application claims priority to an application entitled "LONG-WAVELENGTH OPTICAL FIBER AMPLIFIER", filed in the Korean Industrial Property Office on Sep. 23, 2002 and assigned Ser. No. 2002-57537, the contents of which are hereby incorporated by reference.

BACKGROUND OF THE INVENTION

1. Field of the Invention

The present invention relates to an optical fiber amplifier, and more particularly to a long-wavelength optical fiber amplifier including a long wavelength-band erbium-doped fiber.

2. Description of the Related Art

Problems related to noise figure and gain-flattening occur in erbium-doped fiber amplifiers. This has cause an increased demand for a gain control devices that automatically keep the gain of each channel uniform when there are variations in the number of input channels or in the input optical intensity. Conventional gain control methods using an optical element is are known, but these method have problems in that the configuration of the erbium-doped fiber amplifiers is complicated and it is also difficult to tune its operating parameters according to the positionally conditions of the erbium-doped optical fiber amplifier. In order to cope with such problems, another convention method is known for adjusting the intensity of pumping light by controlling a bias current fed to a pumping light source. However, in the case of a wavelength division multiplexing (WAD) system using a plurality of optical signal channels, it is necessary to control the pumping light source based on an optical signal input through each channel. In addition, such gain control devices also have a problem in that it needs a function to prevent the temporary overflow-phenomena of output optical signals due to increase or decrease in the number of channels.

WAD optical communication networks can be implemented using a C-band of a wavelength in the range of 1528 to 1562 nm. Use of the C-band facilitates the implement the network because the C-band is coincident with the wavelength band that can be used in the erbium-doped optical fiber. Such WAD optical communication networks using the C-band have a channel-interval of 100 GHz (0.8 nm), and can include up to about 40 channels. However, such WAD optical communication networks have a problem in that input/output optical powers in the long-wavelength bands have low conversion efficiency and the noise figure is high due to low-density inversion. On the other hand, in the case where the C-band is divided by 50 GHz (0.4 nm) so as to accommodate up to 80 channels, a nonlinear phenomenon as mentioned above occurs, thereby lowering its applicability. In this case, the L-band in the range of 1570 nm to 1600 nm must be used to constitute a communication line having more than 64 channels.

Generally, a wavelength band in the range of 1528 to 1562 nm is called a C-band or short wavelength band, and a wavelength band in the range of 1570 to 1600 nm is called the L-band or a long wavelength band.

Referring to FIG. 1, the configuration of a long wavelength optical fiber amplifier includes a photo detector 112 for detecting the intensity of an input optical signal, a pumping light source 111, a controller 110, and an erbium-doped optical fiber 120. The controller 110 calculates the number of channels and the amount of optical-intensity loss, based on the detected intensity of an input optical signal. The erbium-doped optical fiber 120 is excited to a first-pumped state by the pumping light source 111, so as to output a long-wavelength light in the L-band.

The photo detector 112 monitors the input optical signal to detect variations of intensity due to an instantaneous change between channels. The photo detector 112 detects the intensity of the input optical signal using a photo diode having a wavelength band equal to that of the input optical signal.

The controller 110 calculates the number of channels and the amount of optical-intensity loss based on the intensity of the input optical signal provided from the photo detector 112. It also provides an output control signal for controlling the output of the pumping light source 111.

The pumping light source 111 may be a semiconductor laser of 98 nm. It outputs a first-pumping light, while controlling the intensity in accordance with the output control signal from the controller 110. In addition, the pumping light source 111 serves as a first-pumping light source of the erbium-doped optical fiber 120. In this regard, it functions to induce a first pumping of the optical fiber 120.

The erbium-doped optical fiber 120 amplifies and outputs an optical signal in the L-band (long-wavelength band). In particular, the optical fiber 120 is brought to a first-pumped state by the first pumping light output from the pumping light source 111. This generates a spontaneously-emitted short-wavelength light in the C-band, which is called an amplified spontaneous emission (BASE). In turn, the amplified spontaneous emission induces a second pumping of the optical fiber to output an induced emission light of the L-band. In this regard, erbium ions in the optical fiber 120 are excited to the first-pumped state by the first pumping light of 980 nm, and then first-pumped erbium ions generate the spontaneous emission of the C-band in the range of 1528 to 1562 nm at the upstream portion in the optical fiber 120. The spontaneous emission is absorbed in the downstream portion of the erbium-doped optical fiber 120 to induce a second pumping. This causes an output of an amplified long wavelength optical signal of the L-band in the range of 1570 to 1600 nm.

However, in such conventional long-wavelength optical fiber amplifiers, which induce the second amplifying of the erbium-doped optical fiber using the first pumping light of 980 nm, a response speed delay is caused by the second pumping operation, thereby causing a control time delay $\Delta t1$, as shown in FIG. 1. This control time delay $\Delta t1$ leads to an increase of a momentary gain variation $\Delta P1$ of the long-wavelength optical fiber amplifier. These momentary gain variations $\Delta P1$ are accumulated during a long-distance transmission of optical light, thereby causing an optical signal error.

Accordingly, there is a need in the art for improved long-wavelength optical fiber amplifiers

SUMMARY OF THE INVENTION

One object of the present invention is to provide a long-wavelength optical fiber amplifier that has a short control time and a swift response speed, thereby reducing the momentary gain-output variation.

In accordance with one aspect of the present invention, the above and other objects can be accomplished by an optical fiber amplifier for amplifying an input optical signal in a long wavelength band, including a first pumping light source for generating and outputting a first pumping light of a predetermined wavelength, a photo detector for detecting an intensity of the input optical signal and an erbium-doped optical fiber. The erbium-doped optical fiber is brought to a first-pumped state by the first pumping light output from the first pumping light source, thereby generating an amplified spontaneous emission in a short wavelength band, and is brought to a second-pumped state by the amplified spontaneous emission, thereby outputting an induced emission light in the long wavelength band. The amplifier also includes a second pumping light source for outputting a second pumping light in the same wavelength band as the amplified spontaneous emission, while controlling an intensity of the second pumping light by an output control signal, so as to control an intensity of the second-pumped state of the erbium-doped optical fiber and a controller for calculating an amount of optical intensity loss and a number of channels of the input optical signal, based on an optical intensity of the input optical signal detected by the photo detector, and transmitting the output control signal to the second pumping light source in order to compensate the amount of optical intensity loss of the input optical signal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail with reference to the drawings. In the following description, a detailed description of known functions and configurations incorporated herein will be omitted when it may make the subject matter of the present invention rather unclear.

Figure 1:
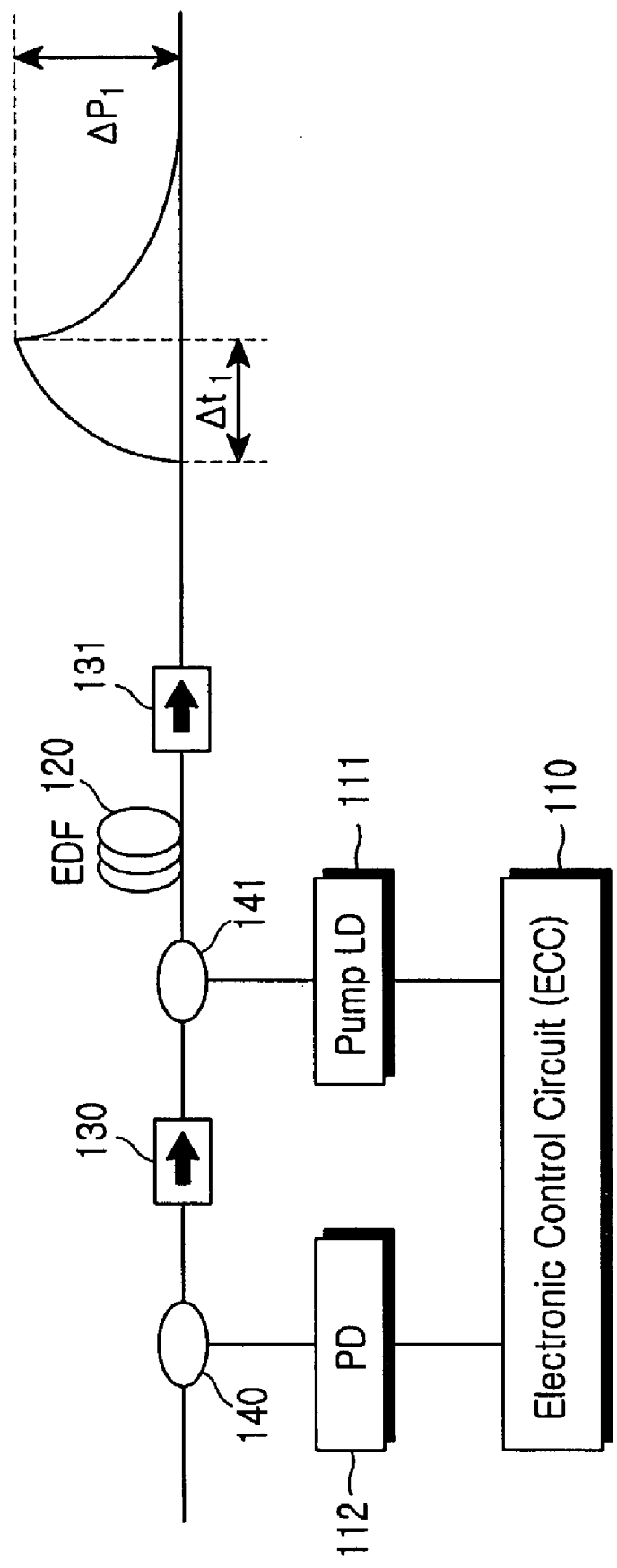
FIG. 1 is a diagram showing the configuration of an optical fiber amplifier for controlling an erbium-doped optical fiber by a pumping light source in the prior art.
Figure 2:
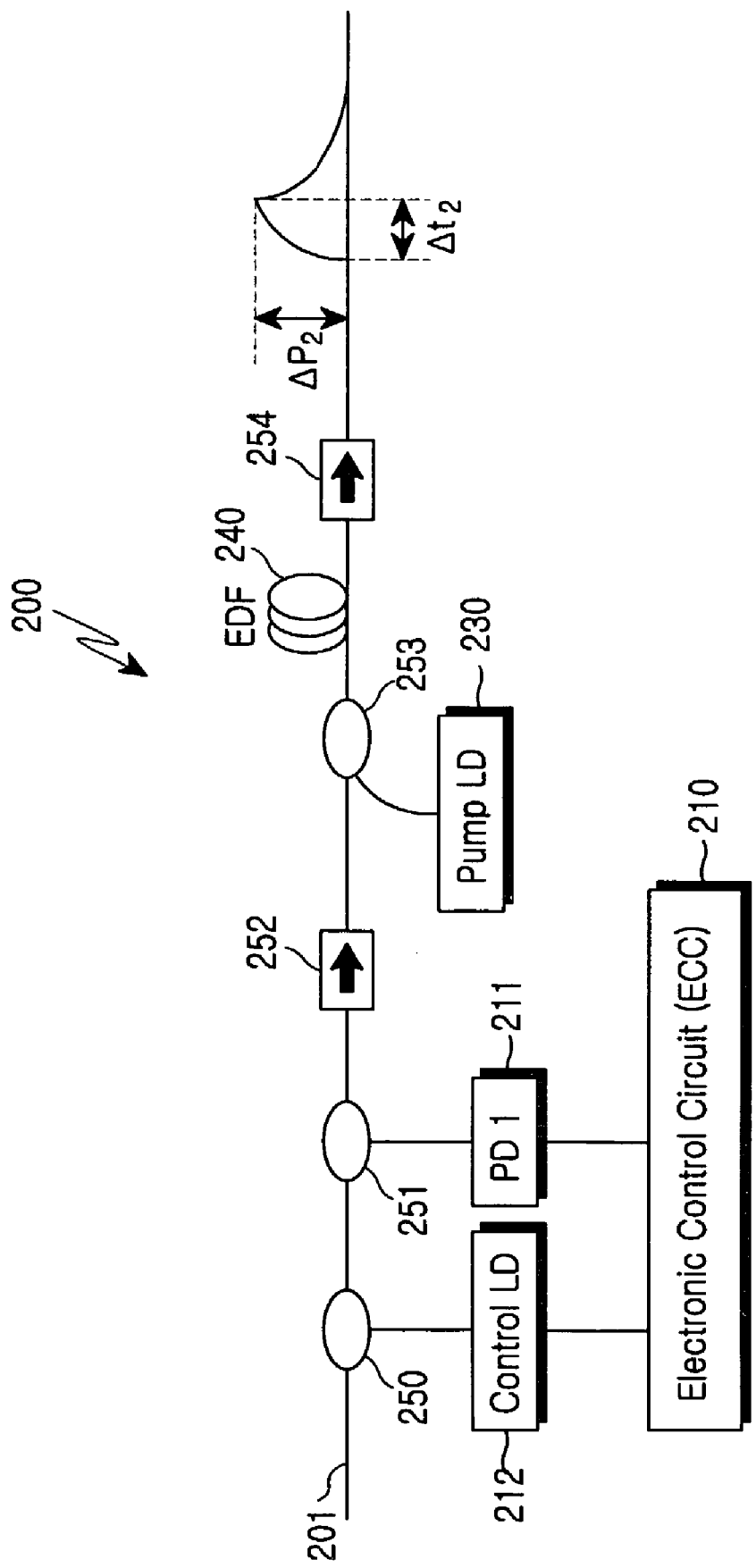
FIG. 2 is a diagram showing the configuration of an optical fiber amplifier for controlling an erbium-doped optical fiber by a second pumping light source in a C-band that is arranged to generate a second pumping light traveling in the forward direction, according to a first embodiment of the present invention.

Referring to FIG. 2, in accordance with a first embodiment, a long-wavelength optical fiber amplifier 200 for amplifying a long wavelength-band input optical signal 201 includes a first pumping light source 230, a photo detector 211, an erbium-doped optical fiber 240, a second pumping light source 212, a controller 210, first and second wavelength-selective couplers 250 and 253, a beam splitter 251, and first and second isolators 252 and 254. The first pumping light source 230 generates and outputs a first pumping light of 980 nm. The photo detector 211 detects the optical intensity of the input optical signal 201. The controller 210 calculates the amount of optical-intensity loss and the number of channels of the input optical signal 201, and provides an output control signal based on the calculated result.

The input optical signal 201 travels from left to right in FIG. 2. A light traveling in the same direction as the traveling direction of the input optical signal 201 is referred to as a forward-directed pumping light and a light traveling in the opposite direction thereto is referred to as a backward-directed pumping light. With respect to the traveling (right) direction of the input optical signal 201, the right side of a given element is referred to as the downstream side of the given element, while the left side thereof is referred to as the upstream side thereof.

The first wavelength-selective coupler 250 is connected to the second pumping light source 212 at the input end of the long-wavelength optical fiber amplifier. This coupler 250 outputs, through one port, both an input optical signal in the long wavelength band and a second pumping light in the short wavelength band output from the second pumping light source 212.

The beam splitter 251 is a kind of tap, which is positioned at the downstream side of the first wavelength-selective coupler 250. The beam splitter 251 splits off part of the input optical signal 201 in the long wavelength band input from the first wavelength-selective coupler 250, and provides the split signal part to the photo detector 211 connected to one side of the beam splitter 251.

The second wavelength-selective coupler 253 outputs, through one port, both the input optical signal 201 passing by the beam splitter 251 and the first pumping light output from the first pumping light source 230.

The first isolator 252 is connected between the beam splitter 251 and the second wavelength-selective coupler 253 and functions to block a backward-traveling light that is reflected from the second wavelength-selective coupler 253 that travels toward the beam splitter 251.

The first pumping light source 230 may be a semiconductor laser of 980 nm in order to bring the erbium-doped optical fiber 240 to the first-pumped state. The first pumping light generated from the first pumping light source 230 enters the erbium-doped optical fiber 240 to induce a short-wavelength BASE (Amplified Spontaneous Emission) of a C-band in the range of 1528 to 1562 nm . The light source 230 is connected to one side of the second wavelength-selective coupler 253.

The first pumping light provided to the optical fiber 240 generates the BASE in the short wavelength band (1528~1562 nm) at the upstream portion in the optical fiber 240, and, in turn, this BASE induces a second pumping in the optical fiber 240, thereby outputting an induced-emission light in the L-band of long wavelength band (1570~1600 nm).

The photo detector 211 detects the optical intensity of the split part of the input optical signal 201 from the beam splitter 251. The photo detector 211 detects the intensity of the input optical signal 201 using a photo diode (not shown)

having the same wavelength band as that of the input optical signal 201. In order to detect the number of channels and the intensity of the input optical signal 201, the photo detector 211 may alternatively include a register, an A/D converter, and a photo diode coupled to each channel of planar waveguide array elements.

The second pumping light source 212 is connected between the first wavelength-selective coupler 250 and the controller 210, and outputs the second pumping light having the same wavelength band as the BASE. The intensity of the output second pumping light is controlled by an output control signal from the controller 210. The second pumping light output from the light source 212 controls the intensity of the second-pumped state of the optical fiber 240.

The controller 210 calculates the number of channels and the amount of optical-intensity loss, using the optical intensity of the input optical signal 201 detected by the photo detector 211, and provides the output control signal for compensating the amount of loss of the input optical signal to the second pumping light source 212.

Figure 3:
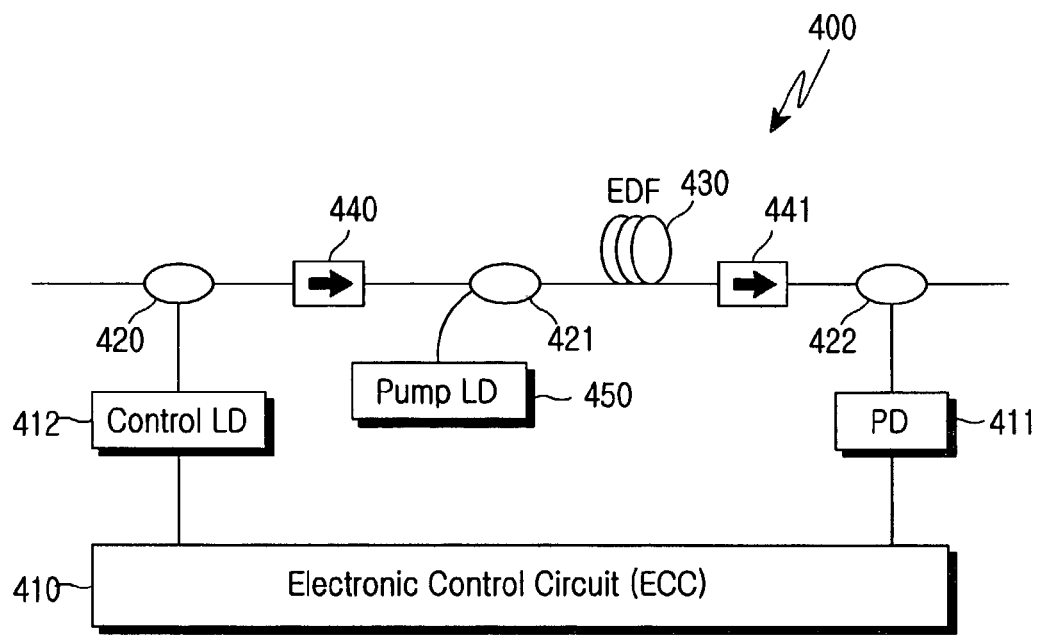
FIG. 3 is a diagram showing the configuration of an optical fiber amplifier for controlling an erbium-doped optical fiber by a second pumping light source in a C-band that is arranged to generate a second pumping light traveling in the forward direction, according to a second embodiment of the present invention.

Referring to FIG. 3, a long-wavelength optical fiber amplifier 400 according to a second embodiment of the present invention is shown. The amplifier 400 includes first and second wavelength-selective couplers 420 and 421, first and second isolators 440 and 441, a first pumping light source 450, an erbium-doped optical fiber amplifier 430, a second pumping light source 412, a photo detector 411, and a controller 410.

A beam splitter 422 is located at the upstream side of the second isolator 440. The photo detector 411 functions to detect the intensity of an amplified optical signal output from the long wavelength optical fiber amplifier 400.

The controller 410 calculates the number of channels and the amount of optical signal loss, based on the intensity of the optical signal detected by the photo detector 411, and provides an output control signal for compensating the amount of loss of the output optical signal to the second pumping light source 412.

Figure 4:
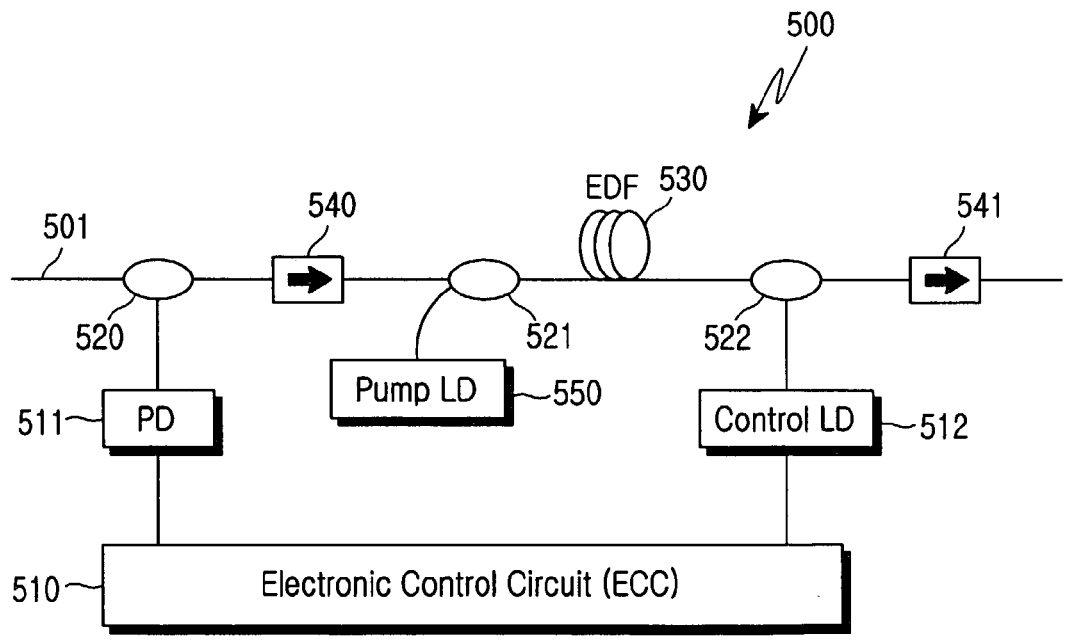
FIG. 4 is a diagram showing the configuration of an optical fiber amplifier for controlling an erbium-doped optical fiber by a second pumping light source in a C-band that is arranged to generate a second pumping light traveling in the backward direction, according to a third embodiment of the present invention; and, FIG. 5 is a diagram showing the configuration of an optical fiber amplifier for controlling an erbium-doped optical fiber by a second pumping light source in a C-band that is arranged to generate a second pumping light traveling in the backward direction, according to a fourth embodiment of the present invention.

Referring to FIG. 4, a long-wavelength optical fiber amplifier 500 according to a third embodiment of the present invention is shown. The amplifier 500 includes a beam splitter 520, a first wavelength-selective coupler 521, first and second isolators 540 and 541, a first pumping light source 550, an erbium-doped optical fiber 530, a second pumping light source 512, a second wavelength-selective coupler 522, and a controller 510. The first and second isolators 540 and 541 block a backward-traveling light that travels opposite to the traveling direction of an input optical signal 501. The erbium-doped optical fiber 530 outputs an induced-emission light in the long wavelength band. The controller 510 controls the output of the second pumping light source 512. The beam splitter 520 is located at the upstream side of the first isolator 540, splits off part of the input optical signal, and provides the split signal part to the photo detector 511.

The first wavelength-selective coupler 521 is located at the downstream of the beam splitter 520, and outputs both the input optical signal 501 in the long wavelength band and the first pumping light through one port.

The first isolator 540 is connected between the beam splitter 520 and the first wavelength-selective coupler 521, and blocks a backward-traveling light that travels toward the beam splitter 520.

The first pumping light source 550 is coupled to one side of the first wavelength-selective coupler 521, and outputs a first pumping light so as to bring the erbium-doped optical fiber 530 to a first-pumped state.

The erbium-doped optical fiber 530 is located at the downstream side of the first wavelength-selective coupler 521, and is brought to the first-pumped state, thereby outputting the BASE. This BASE induces the second pumping in the optical fiber 530, thereby outputting an induced-emission light in the same long wavelength band as that of the input optical signal.

The photo detector 511 is coupled to one side of the beam splitter 520, and detects the intensity of the input optical signal 501, using the signal split from the beam splitter 520.

The second pumping light source 512 is connected to one side of the second wavelength-selective coupler 522, and outputs the second pumping light in the short wavelength band. The second pumping light output from the second pumping light source 512 adjusts the intensity of the second-pumped state of the optical fiber 530.

The second wavelength-selective coupler 522 is located at the downstream side of the optical fiber 530. This coupler 522 allows the induced-emission light in the long wavelength band output from the optical fiber 530 to be transmitted through the coupler 522, and provides the second pumping light to the optical fiber 530.

The controller 510 calculates the number of channels and the amount of loss of the optical signal, based on the intensity of the input optical signal 501 detected by the photo detector 511, and provides an output control signal for compensating the amount of loss of the input optical signal to the second pumping light source 512.

The second isolator 541 is located at the output end of the long-wavelength optical fiber amplifier 500 at the downstream side of the second wavelength-selective coupler 522, and blocks a backward-traveling light that travels opposite to the traveling direction of the input optical signal 501.

Figure 5:
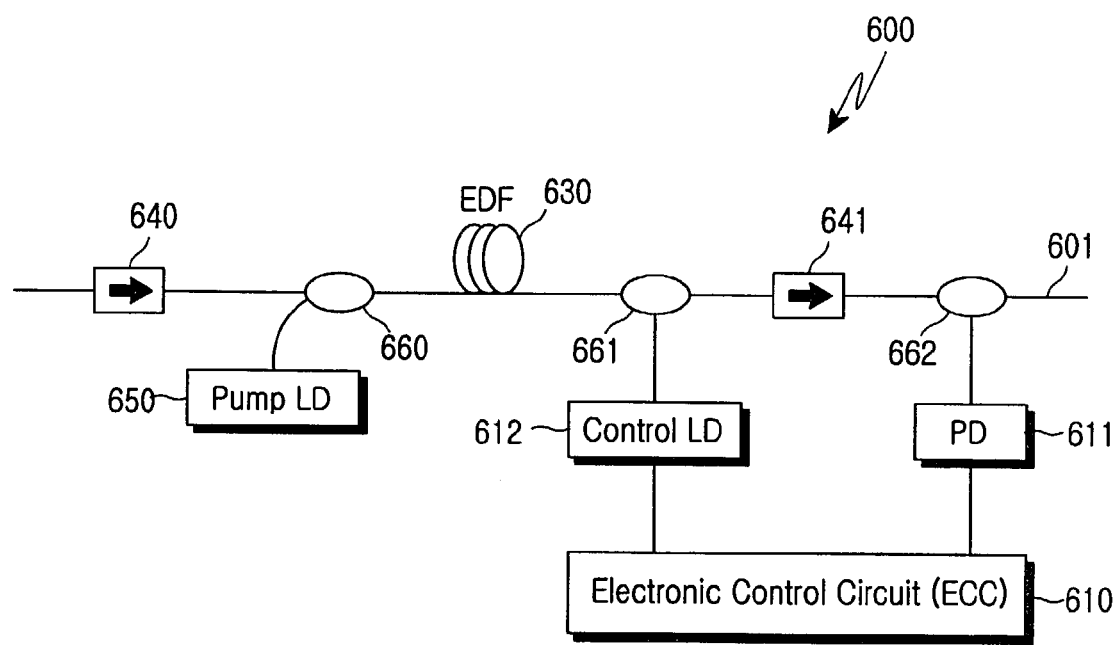

Referring to FIG. 5, a long-wavelength optical fiber amplifier 600 according to a fourth embodiment of the present invention is shown. The amplifier 600 includes a beam splitter 662, a first wavelength-selective coupler 660, first and second isolators 640 and 641, a first pumping light source 650, an erbium-doped optical fiber 630, a second pumping light source 612, a second wavelength-selective coupler 661, and a controller 610. The first and second isolators 640 and 641 block a backward-traveling light that travels opposite to the traveling direction of an input optical signal 601. The erbium-doped optical fiber 630 outputs an induced-emission light in the long wavelength band. The second pumping light 612 outputs a second pumping light. The controller 610 controls the output of the second pumping light source 612.

The beam splitter 662 is located at the output side of the long-wavelength optical fiber amplifier 600. The beam splitter 662 splits off part of the output optical signal of the optical fiber amplifier, and provides the split signal part to the photo detector 611.

The first wavelength-selective coupler 660 is located at the upstream side of the optical fiber 630, and outputs the input optical signal 601 in the long wavelength band and the first-pumped light to one port.

The first pumping light source 650 is coupled to one side of the first wavelength-selective coupler 660, and outputs the first pumping light.

The erbium-doped optical fiber 630 is connected between the first wavelength-selective coupler 660 and the second wavelength-selective coupler 661, and is brought to the first-pumped state by the first pumping light, thereby outputting the BASE. This BASE induces the second pumping in the optical fiber 630, so as to output an induced-emission light in the same long wavelength band as that of the input optical signal.

The photo detector 611 is coupled to one side of the beam splitter 662, and detects the intensity of part of the output optical signal split from the beam splitter 662.

The second pumping light source 612 is connected to one side of the second wavelength-selective coupler 661, and outputs the second pumping light in the short wavelength band according to an output control signal from the controller 610. The second pumping light output from the second pumping light source 612 adjusts the intensity of the second-pumped state of the optical fiber 630. The second pumping light travels opposite to the traveling direction of the input optical signal, entering the optical fiber 630.

The second wavelength-selective coupler 661 is located at the downstream of the optical fiber 630. This coupler 661 allows the induced-emission light in the long wavelength band output from the optical fiber 630 to be transmitted through the optical fiber 630, and provides the second pumping light in the short wavelength band to the optical fiber 630.

The controller 610 calculates the number of channels and the amount of loss of the optical signal, based on the result of comparing the intensity of the input optical signal with the intensity of the output optical signal detected by the optical detector 611. In addition, this controller 610 provides an output control signal for compensating the amount of loss of the input optical signal 601 to the second pumping light source 612.

The first and second embodiments as shown in FIGS. 2 and 3 have a forward directed pumping structure such that the second pumping light source (212 and 412) is located at the upstream side of the erbium-doped optical fiber (240 and 430). In this case, the traveling direction of the input optical signal (e.g., 201) is the same as that of the second pumping light. On the other hand, the third and fourth embodiments as shown in FIGS. 4 and 5 have a backward-directed pumping structure such that the second pumping light source (512 and 612) is located at the downstream side of the erbium-doped optical fiber (530 and 630). In this case, the traveling direction of the input optical signal (501 and 601) is opposite to that of the second pumping light.

As apparent from the above description, according to various embodiments of the present invention, because the intensity of the optical signal in the erbium-doped fiber is controlled using a semiconductor laser having the same wavelength has the amplified spontaneous emission (ASE) of the erbium-doped optical fiber, the response time and the control time Δt2 are reduced. This reduction of the control time Δt2 suppresses the momentary gain variation Δp2 of the output optical signal in the WAD communication configuration in which a momentary channel drop/add occurs. This, as a result, minimizes the data receiving/transmitting errors that are caused by the momentary gain variations ΔP1 accumulated during a long-distant transmission.

As mentioned in the above embodiments, a long-wavelength optical fiber amplifier equipped with the second pumping light source is advantageous because the second pumping of the erbium-doped optical fiber is controlled using the second pumping light source. The control time is thus reduced to improve the characteristics of the momentary gain variations and reducing the cause of errors in optical signal transmission. Consequently, this achieves a more secure reception/transmission of optical signal. In the conventions systems discussed above, the control time Δt1 is usually 200 μs. In contrast, in the embodiments of the present invention discussed above, the control time Δt2 is reduced to about 60 μs.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical fiber amplifier for amplifying an input optical signal in a long wavelength band, comprising:
    a first pumping light source for generating and outputting a first pumping light of a predetermined wavelength;
    a photo detector for detecting an intensity of the input optical signal;
    an erbium-doped optical fiber that is brought to a first-pumped state by the first pumping light output from the first pumping light source, which generates an amplified spontaneous emission in a short wavelength band, and that is brought to a second-pumped state by the amplified spontaneous emission, which causes an induced emission light in the long wavelength band to be output;
    a second pumping light source for outputting a second pumping light in the same wavelength band as the amplified spontaneous emission, while controlling an intensity of the second pumping light by an output control signal, so as to control an intensity of the second-pumped state of the erbium-doped optical fiber; and,
    a controller for calculating an amount of optical intensity loss and a number of channels of the input optical signal, based on an optical intensity of the input optical signal detected by the photo detector, and transmitting the output control signal to the second pumping light source in order to compensate the amount of optical intensity loss of the input optical signal.

2. The optical fiber amplifier as set forth in claim 1, further comprising:
    a first wavelength-selective coupler for outputting the input optical signal in the long wavelength band and the second pumping light in the short wavelength band though one port;
    a beam splitter, positioned at a downstream side of the first wavelength-selective coupler, for splitting off part of the input optical signal received from the first wavelength-selective coupler and outputting the split signal part to the optical detector;
    a second wavelength-selective coupler, positioned at an upstream side of the erbium-doped optical fiber, for outputting both the input optical signal in the long wavelength band received from the beam splitter and the first pumping light through one port;
    a first isolator, positioned between the beam splitter and the second wavelength-selective coupler, for blocking a backward-traveling light that travels toward the beam splitter; and,
    a second isolator, positioned at a downstream side of the erbium-doped optical fiber, for blocking a backward-traveling light that travels toward the erbium-doped optical fiber.

3. The optical fiber amplifier as set forth in claim 1, wherein the second pumping light source outputs the second pumping light in a traveling direction of the input optical signal.

4. The optical fiber amplifier as set forth in claim 1, wherein the predetermined wavelength is 980 nm.

5. The optical fiber amplifier as set forth in claim 1, wherein the amplified spontaneous emission in a short wavelength band in the range of 1528 to 1562 nm.

6. The optical fiber amplifier as set forth in claim 1, wherein the photo detector includes a register, an A/D converter, and a plurality of photo diodes.

7. An optical fiber amplifier for amplifying an input optical signal in a long wavelength band, comprising:
   a beam splitter for splitting off part of an input optical signal;
   a first wavelength-selective coupler for outputting both the input optical signal in the long wavelength band and a first pumping light through one port;
   a first isolator, positioned between the beam splitter and the first wavelength-selective coupler, for blocking a backward-traveling light that travels toward the beam splitter;
   a first pumping light source, coupled to one side of the first wavelength-selective coupler, for outputting the first pumping light of predetermined wavelength;
   an erbium-doped optical fiber, positioned at a downstream of the first wavelength-selective coupler, which is brought to a first-pumped state by the first pumping light, which causes an amplified spontaneous emission to be output, and is brought to a second-pumped state, which causes an induced-emission light in the long wavelength band to be output;
   an optical detector, coupled to one side of the beam splitter, for detecting an intensity of the input optical signal based on the part of the input optical signal split from the beam splitter;
   a second wavelength-selective coupler, positioned at a downstream of the erbium-doped optical fiber, for allowing the induced-emission light in the long wavelength band output from the optical fiber to be transmitted through the optical fiber, and providing a second pumping light in a short wavelength band to the optical fiber;
   a second pumping light source, connected to one side of the second wavelength-selective coupler, for outputting the second pumping light in the short wavelength band, while controlling an intensity thereof according to an output control signal, so as to control an intensity of an second-pumped state of the erbium-doped optical fiber;
   a second isolator, positioned at an upstream of the second wavelength-selective coupler, for blocking a backward-traveling light that travels toward the second wavelength-selective coupler; and,
   a controller for calculating an amount of optical intensity loss and a number of channels of the input optical signal, based on an optical intensity of the input optical signal detected by the photo detector, and transmitting the output control signal to the second pumping light source in order to compensate the amount of optical intensity loss of the input optical signal.

8. The optical fiber amplifier as set forth in claim 4, wherein the second pumping light source outputs a second pumping light of short wavelength band traveling opposite to a traveling direction of the input optical signal.

* * * * *